(12) United States Patent
Horrigan

(10) Patent No.: US 10,159,224 B1
(45) Date of Patent: Dec. 25, 2018

(54) DISPOSABLE BIRD FEEDER WITH ONBOARD SUSPENSION MEANS

(71) Applicant: Richard P. Horrigan, Roxbury, CT (US)

(72) Inventor: Richard P. Horrigan, Roxbury, CT (US)

(*) Notice: Subject to any disclaimer, the term of this patent is extended or adjusted under 35 U.S.C. 154(b) by 0 days.

(21) Appl. No.: 15/932,921

(22) Filed: May 22, 2018

Related U.S. Application Data

(60) Provisional application No. 62/603,453, filed on May 30, 2017.

(51) Int. Cl.
*A01K 39/01* (2006.01)
*B65D 53/08* (2006.01)
*B65D 25/22* (2006.01)

(52) U.S. Cl.
CPC .......... *A01K 39/0106* (2013.01); *B65D 25/22* (2013.01); *B65D 53/08* (2013.01)

(58) Field of Classification Search
CPC .... A01K 5/015; A01K 39/0106; A01K 39/01; A01K 39/04; A23K 10/40; B65D 53/08; Y10S 426/805
USPC .... 119/51.03, 464, 465; 206/45.2, 755, 769, 206/770, 774
See application file for complete search history.

(56) References Cited

U.S. PATENT DOCUMENTS

| | | | | |
|---|---|---|---|---|
| 865,173 A | * | 9/1907 | Eichberg | B65D 1/38 119/461 |
| 2,235,959 A | * | 3/1941 | Copeman | A01K 39/0106 119/51.03 |
| 2,306,312 A | * | 12/1942 | Hyde | A01K 39/0106 119/57.8 |
| 2,709,985 A | * | 6/1955 | Clauson | A01K 5/015 119/464 |
| 3,200,790 A | * | 8/1965 | Anderson | A01K 5/015 119/51.03 |
| 3,848,570 A | * | 11/1974 | Scigliano | A01K 39/0106 119/51.03 |
| 4,437,432 A | * | 3/1984 | Immeyer | A01K 39/0106 119/464 |
| 5,052,342 A | * | 10/1991 | Schneider | A01K 39/0106 119/51.03 |
| 5,377,617 A | * | 1/1995 | Harwich | A01K 39/0113 119/57.8 |

(Continued)

FOREIGN PATENT DOCUMENTS

| | | | | |
|---|---|---|---|---|
| DE | 2851297 A1 | * | 6/1979 | .......... A01K 1/0356 |
| DE | 3051223 C2 | * | 12/1993 | .......... A01K 39/0106 |

*Primary Examiner* — Peter M Poon
*Assistant Examiner* — Danielle A Clerkley
(74) *Attorney, Agent, or Firm* — K. Gibner Lehmann

(57) ABSTRACT

A disposable bird feeder preferably containing suet cake or other edible substance, is housed in a protective container carrying a removable, adhesive backed manufacturer's label. Concealed behind the label and in front of the container's one wall is a flat collapsed, multi-part suspension linkage. The arrangement is such that the linkage, when unfolded and extended, can be utilized to hang the container from a tree or other support. At one end of the linkage is a split suspension loop. In the event of loss or breakage of the container or its contents, a new unit can be installed, with a minimum of time, mess, and expense. Metal cages and the like are neither required, nor utilized in most installations.

3 Claims, 7 Drawing Sheets

(56) References Cited

U.S. PATENT DOCUMENTS

| | | | | |
|---|---|---|---|---|
| 5,699,752 | A | * | 12/1997 | Wilkins ............. A01K 39/0106 119/51.03 |
| 5,826,541 | A | * | 10/1998 | Wilkins ............. A01K 39/0106 119/57.8 |
| 6,499,429 | B1 | * | 12/2002 | Hein ...................... A01K 39/01 119/51.03 |
| 7,131,395 | B1 | * | 11/2006 | Lush .................. A01K 39/0106 119/57.8 |
| D652,579 | S | * | 1/2012 | DeLorme ..................... D30/124 |
| 2007/0084412 | A1 | * | 4/2007 | Eager ................ A01K 39/0106 119/51.03 |
| 2008/0273817 | A1 | * | 11/2008 | Giro Amigo .......... B65D 29/04 383/16 |
| 2009/0180717 | A1 | * | 7/2009 | Ferrer ................... B65D 29/04 383/117 |

* cited by examiner

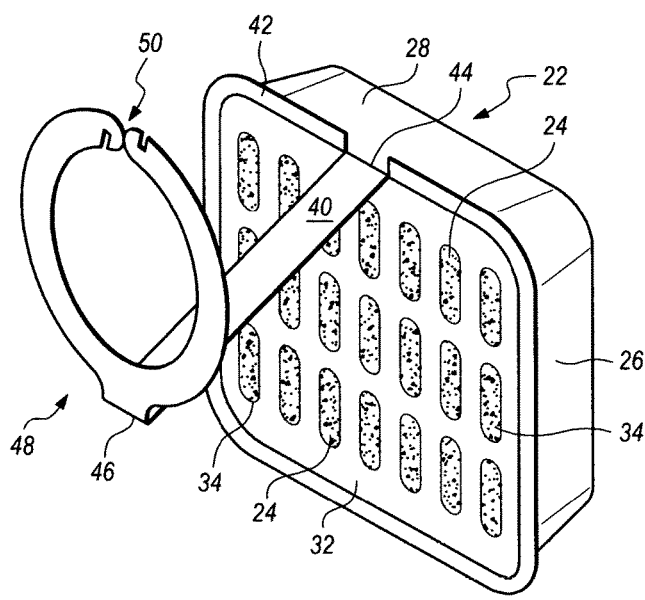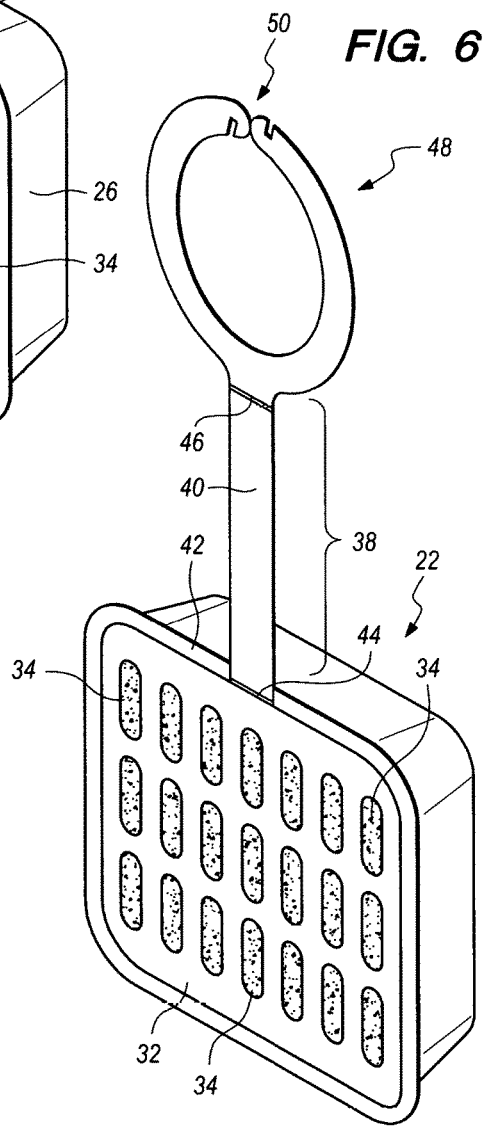

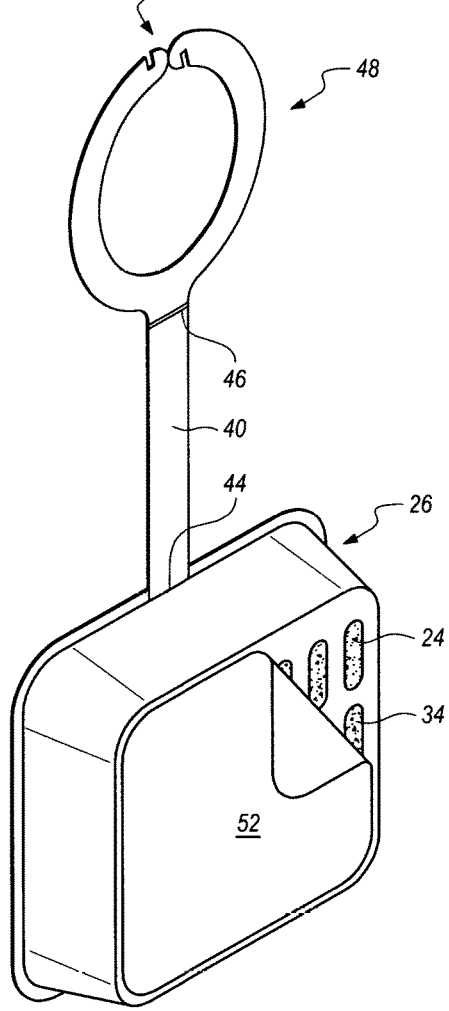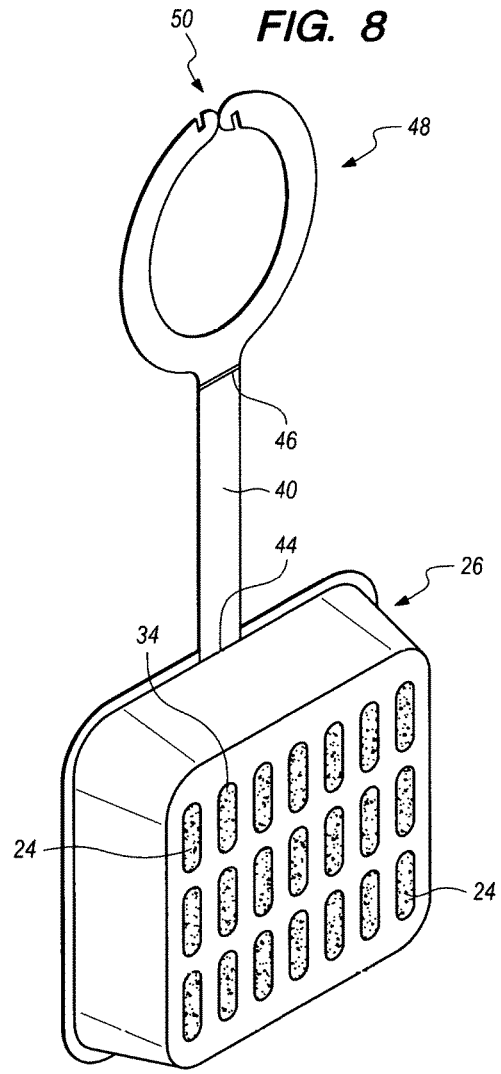

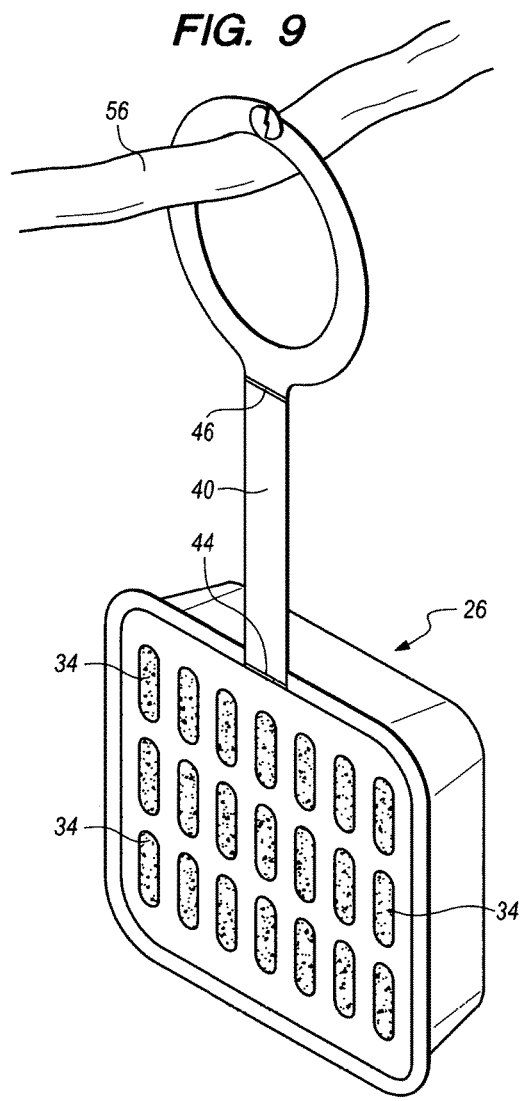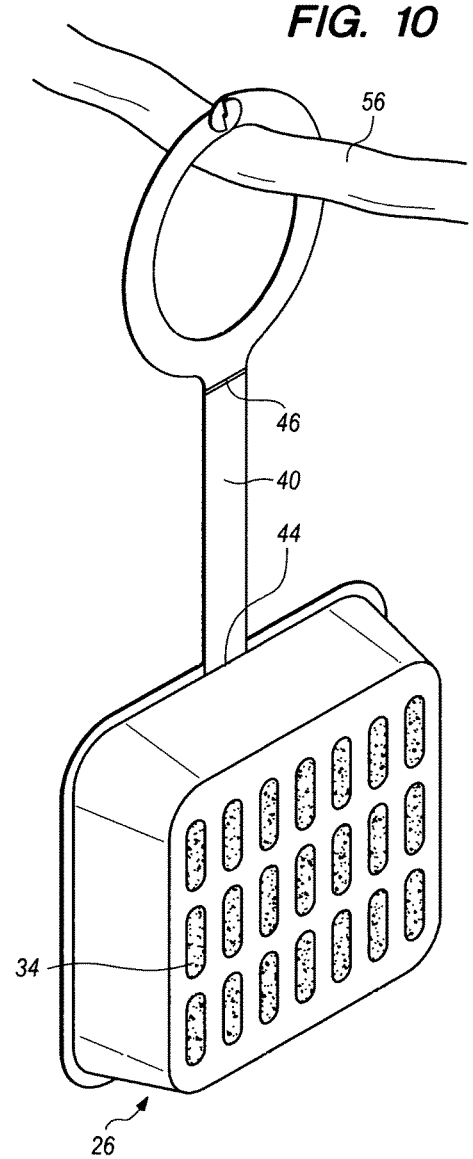

FIG. 12
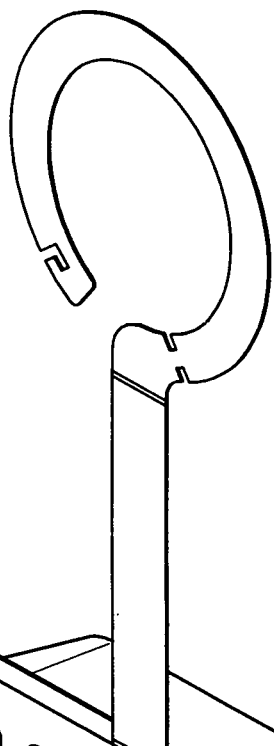
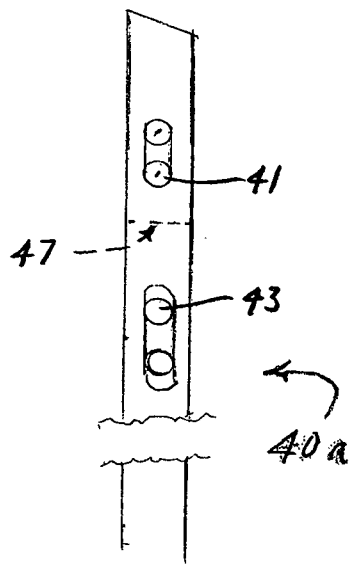
FIG. 13

DISPOSABLE BIRD FEEDER WITH ONBOARD SUSPENSION MEANS

CROSS REFERENCE TO RELATED APPLICATION

The present application claims the benefit of my application, U.S. Ser. No. 62/603,453 filed May 30, 2017.

FIELD OF THE INVENTION

The present invention relates to bird feeders, and more particularly to inexpensive feeders of a type intended for short term use.

BACKGROUND OF THE INVENTION AND SAMPLING OF PRIOR ART

Over the years, a relatively large number of bird feeder devices have been proposed and produced, as indicated by the many patents that have been applied for and issued. A random sampling can be seen by reference to the following U. S. Patents, spanning the years 2009-2017:

| | |
|---|---|
| U.S. Pat. No. 7,574,976: | BIRD FEEDER POST AND DEVICE TO INHIBIT SQUIRRELS |
| U.S. Pat. No. 7,740,216: | SUSPENSION SYSTEM FOR A BIRD FEEDER |
| U.S. Pat. No. 7,992,520: | SQUIRREL-PROOF BIRD FEEDER AND FEED LEVEL CONTROL DEVICE |
| U.S. Pat. No. 8,230,809: | ADJUSTABLE SQUIRREL PROOF BIRD FEEDER |
| U.S. Pat. No. 8,342,127: | SQUIRREL RESISTANT HOPPER TYPE BIRD FEEDER |
| U.S. Pat. No. 8,978,586: | WILD BIRD FEED DISPENSER WITH SQUIRREL-RESISTANT MECHANISM |
| U.S. Pat. No. 9,179,649: | WILD BIRD FEED DISPENSER WITH SQUIRREL-RESISTANT MECHANISM |
| U.S. Pat. No. 9,526,232: | SQUIRREL PROOF SUSPENDED BIRD FEEDER |
| U.S. Pat. No. 9,314,004: | BIRD AND ANIMAL FEEDER ARRANGEMENT AND ARTICLE HANGING METHOD |

These disclosures are indicative of the problem faced by the dedicated bird-watcher, namely keeping the feed in place while trying to discourage interference from squirrels, foxes, bears, or other ground animals.

More to the point, with the advent of zone-approved, large scale housing and residential development adopted by many towns in the United States, there has been a corresponding reduction in the amount of wooded acreage and open space that formerly accommodated the animal population noted above. Their casual movements into neighborhood back yards is now becoming more commonplace, especially in the New York and New England areas.

A number of commercially available feed arrangements are offered for sale, from multiple suppliers and manufacturers of suet cake. Particularly, the following feed accessories can be found on the internet as of the date of filing of the present application.

One current listing is called "Mealworm feeder with Guard", manufactured by Drs. Foster and Smith. Still others are "Woodlink Coppertop" by BestNest.com; "Pine Tree 1451 Wire Feeder" sold at Amazon.com; "Double Suet Basket", by Wildbeaks.com; and "Nature's Way 6$qt$. Cedar" from Jet.com.

Consumers who purchase the feed that is sold in metal wire retaining cages are experiencing problems with bears who merely seize the whole cage and its contents and drag it off to the woods. The property owner then is faced with complete replacement of the cage and its contents. Obviously the bear has no concern about wrecking the cage, and when he is finished, he leaves a mangled cage with the suet cake oozing out through the cage openings, this being disposed somewhere in the woods adjacent to the owner's back yard.

Moreover, the owner often does not know whether to replace just the suet cake, or a new cage containing a new cake. Due to the nature of suet cake, it is unpleasant to attempt to salvage just a residual portion, because of its unpleasant, greasy consistency.

SUMMARY OF THE INVENTION

While some of the devices above noted have achieved success in the marketplace, to the best of my knowledge, none of the cited prior art arrangements successfully meet the squirrel/bear problem as noted above.

The present invention particularly addresses this problem and thus obviates some of the drawbacks and disadvantages.

At least some of the following objects are:

To provide a novel and improved, inexpensive bird feeder which is simple in it structure and especially easy to use.

To provide a bird feeder in accordance with the foregoing, wherein the need for wire or metal cages is largely eliminated, thereby reducing incidental buildup of cages and rendering the invention environmentally friendly.

To provide a bird feeder as above characterized, wherein the consumer avoids the possibility of adverse soiling of his hands or clothing from incidental contact with the feed contents, especially suet cake.

To provide a bird feeder as above set forth, which can be economically fabricated, using available wrapping/folding equipment that seals the bird food in a pack or cartridge that is favorable toward maintaining clean storage and shipping procedures.

The invention provides a disposable bird feeder, comprising in combination a substantially expansive, multi-faceted cake constituted of material suitable for consumption by birds, a protective container of cellulose or plastic substance, encircling the cake on all but one of its faces, said one face having a plurality of holes so as to expose the cake and enable access thereto through said holes by birds seeking food, a thin face sheet having an adhesive backing overlying the said one face of the cake, so as to cover the face and at least some of said plurality of holes and thereby effectively isolate the cake from debris and other substances exterior to the cake, said face sheet being removable from the remainder of the protective container, a flat plastic, resilient latch means sandwiched between the said one face of the cake and the thin face sheet, a flat plastic strap connected to the protective wrapper and to a latching loop, the connection to the latching loop comprising a living hinge, said strap and loop being normally concealed by the thin face sheet and being movable with respect to the wrapper and extendable therefrom when the face sheet is removed, so as to form a suspension link between the latch means and the container, whereby the container and cake can be hung from a tree branch or other support by temporarily opening the resilient latch means and fastening it around said branch or other support.

Other features and advantages will hereinafter appear.

BRIEF DESCRIPTION OF THE DRAWINGS

In the accompanying drawings illustrating preferred embodiments of the invention:

FIG. 5 is a view like FIG. 4, except showing the unfolding and partial extension of the suspension/linkage means of FIG. 4.

FIG. 6 is a perspective view like FIGS. 4 and 5, except showing the full extension of the suspension/linkage means of these figures, as they would appear if held in an upright and operative position.

FIG. 7 is a rear perspective view of the cartridge shown in FIG. 6, and illustrating secondary access holes in the rear face of the cartridge, and with a protective manufacturer's label being partially peeled away.

FIG. 8 is a view like FIG. 7 showing the label completely removed, wherein the bird feeder would be fully operational when mounted on a tree branch.

FIG. 9 is view like FIG. 6 and showing the front and sides of the cartridge in operative position, suspended from a tree branch.

FIG. 10 is a view like FIG. 9, except showing the rear and sides of the cartridge in operative position, again suspended from a tree branch.

FIG. 12 is a view perspective view like FIGS. 9 and 10, except utilizing a modified suspension/linkage means, having a slightly different arrangement of a supporting loop that would surround a tree branch, and FIG. 13 is a fragmentary of an alternate strap for hanging the cartridge from a tree branch or other support.

DESCRIPTION OF THE PREFERRED EMBODIMENT, AND BEST MODES FOR CARRYING OUT THE INVENTION AS OF THE INSTANT FILING DATE

Figure 1:
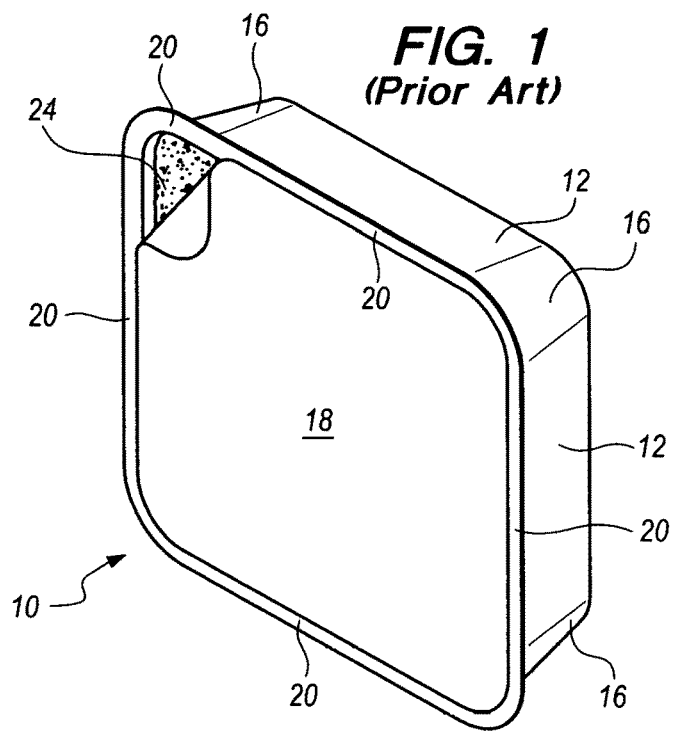
FIG. 1 is perspective top view of a known bird feeder cartridge containing animal fats and derivatives thereof.
Figure 2:
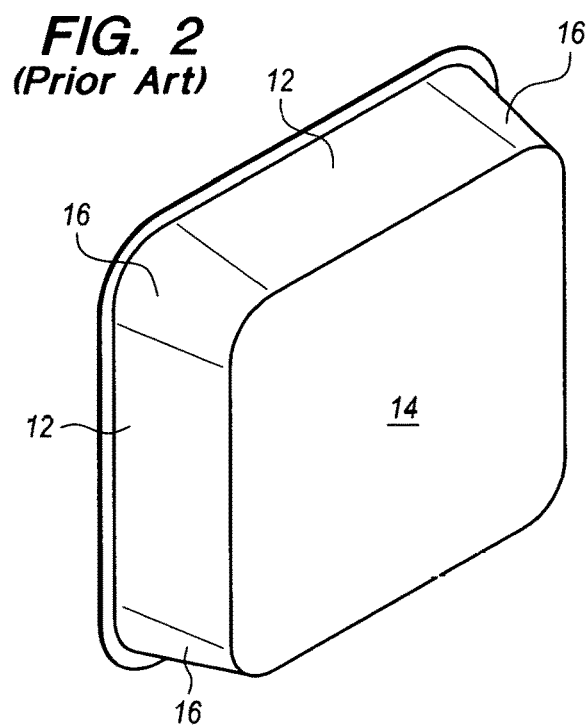
FIG. 2 is a perspective bottom view of the cartridge of FIG. 1.
Figure 3:
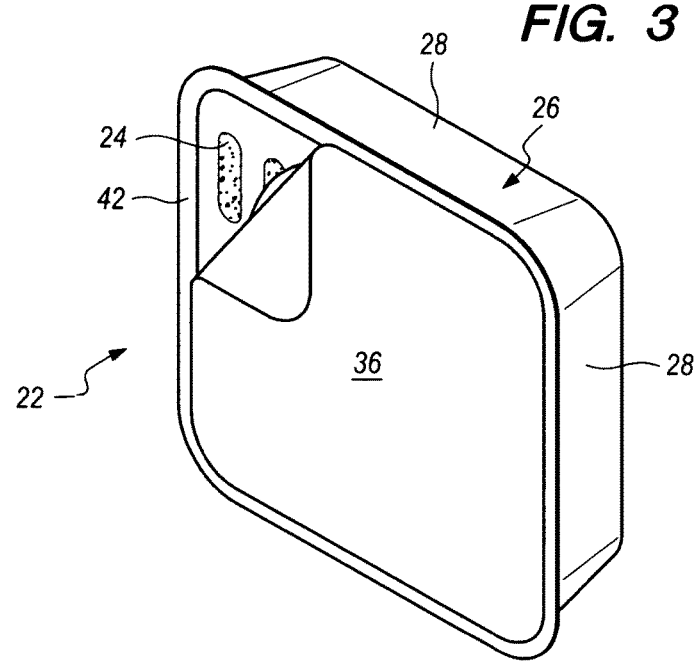
FIG. 3 is a perspective top view of the improved bird feed cartridge of the present invention, showing one of a series of access holes that are used to facilitate a bird's pecking at the feed.
Figure 4:
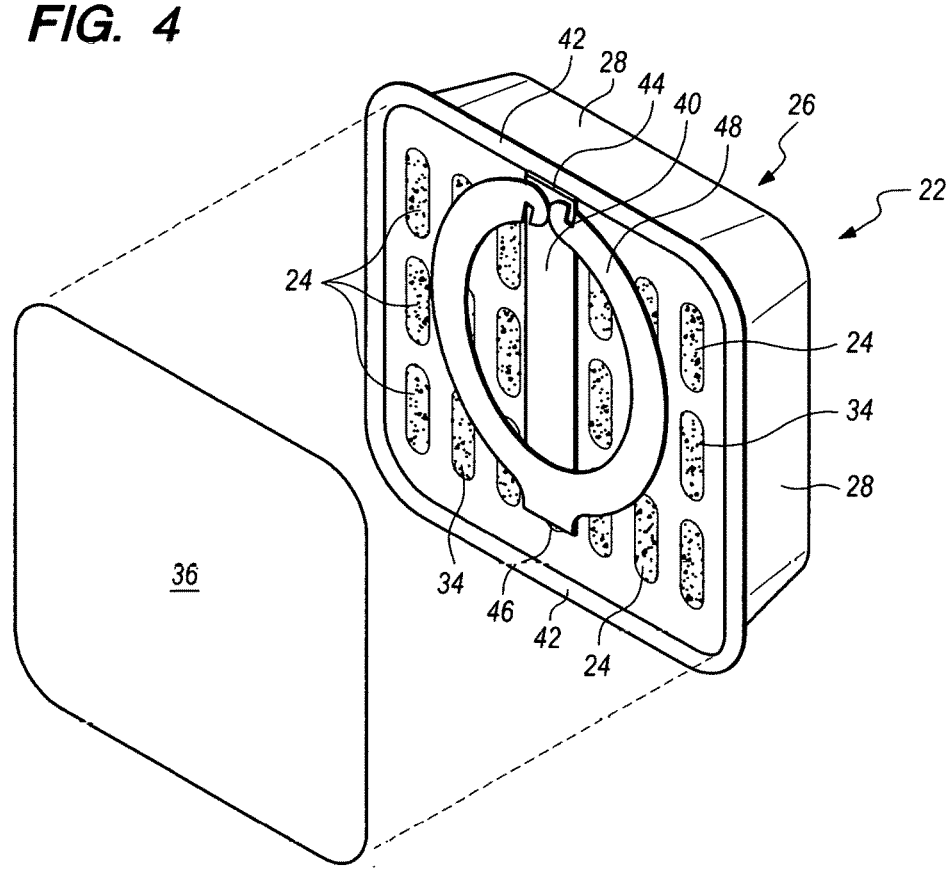
FIG. 4 is an exploded view of the cartridge of FIG. 3, showing details of the self-contained suspension/linkage means as provided by the invention, and illustrating multiple access holes similar to those of the previous figure.
Figure 11:
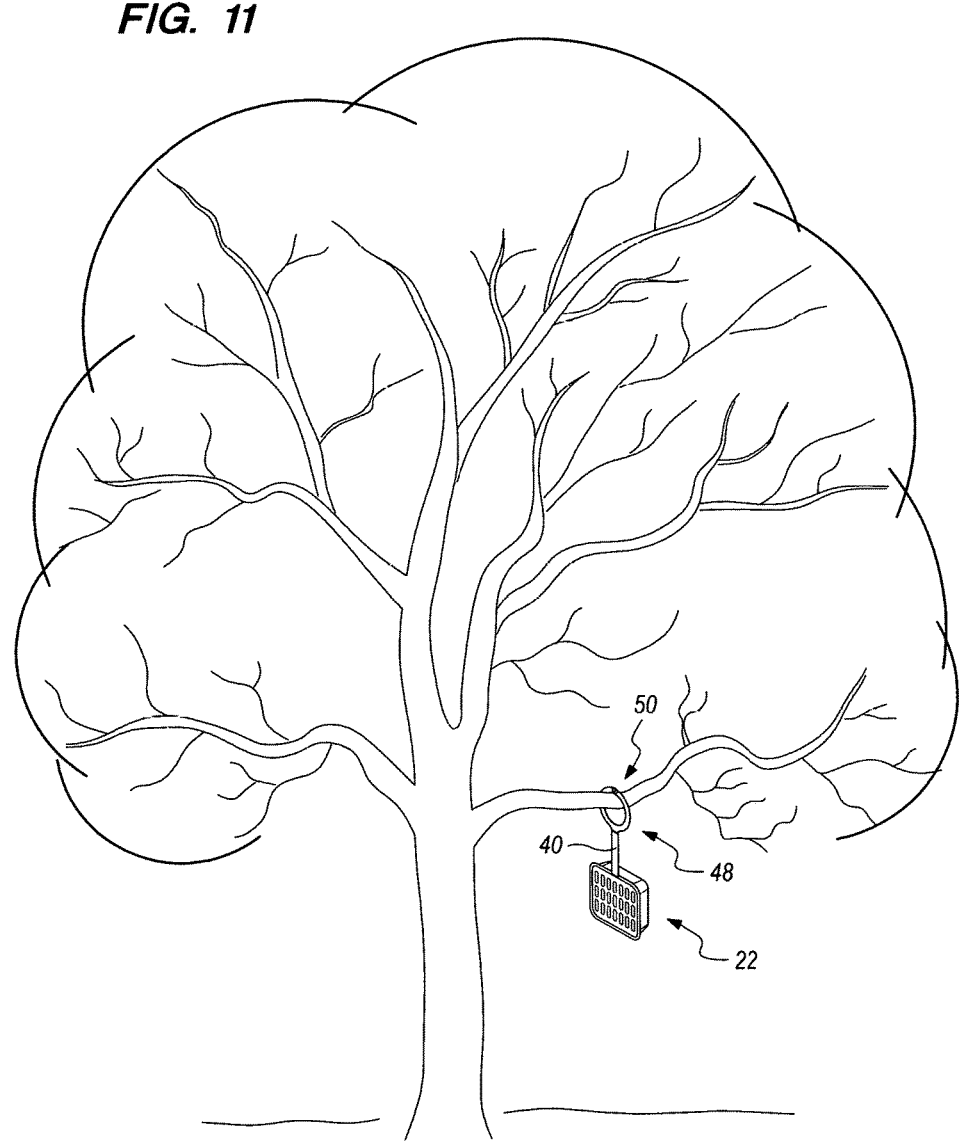
FIG. 11 is a perspective view of the cartridge of the invention in operative position, suspended from a tree branch.

Referring first to FIGS. 1 and 2, there is illustrated a known bird feed cartridge of a type consisting of a block of suet dough that is housed in a container constituted of cellophane or equivalent wrapping material. The cartridge is generally designated by the numeral 10, preferably has a rectangular prism shape, consisting of four sides 12, a rear panel 14, and corner portions 16. The front face of the cartridge consists of a sheet 18 of cellophane that is adhered to four peripheral frontal edge flanges 20 of the four sides 12, preferably by means of heat sealing, ultrasonic weld, or other known processes. The sheet 18 is capable of being removed by the user, by separating one corner and thereafter peeling back the remainder from the peripheral frontal edge flanges of the cartridge 10. FIG. 1 shows one corner of a similar sheet 18 peeled back in accordance with this method of opening the cartridge. Access to the contents, such as suet cake, is thereby rendered available upon full removal of the sheet.

Following opening, cartridges of this type generally are utilized with a wire cage (not shown) having a box-like configuration and sized sufficiently to receive the cartridge 10 as an insert. In accomplishing this, the user removes the cartridge from its container by slapping the opened container on a flat surface and using a flat blade, if necessary, to slide it into the interior of the wire cage. The latter is then suspended from a support such as a pole or tree branch. While thousands of such housed suet cakes are sold every week, there exist a number of drawbacks with the accompanying wire cages that are needed to support the cakes.

First, the consumer is faced with peeling off a front face of the unit by hand, and inserting or removing the suet dough for transfer to or from the cage, respectively. In some installations, the cage is mounted in position and intended to remain in place, over a period of weeks or months.

However, during replacement of deplenished suet cake remnants, the consumer's hands inevitably come into contact with the suet dough, which is usually constituted as a relatively gooey or sticky semi-solid emulsion that tends to cling to the skin, or to utensils that are used to peel back the front sheet of the cartridge. Suet normally consists of animal by-products and/or residual animal fat pressed into the shape of a slab as shown. The dough will hold its shape during handling, and until it can be positioned in the supporting wire cage.

Secondly, and more important, is the fact that with the continual reduction in the wooded areas that are the habitat for more and/or larger wild animals, bird feeders are continually being attacked by ground mammals such as squirrels, foxes and even bears. Bears frequently seize the entire wire cage containing the dough, break it away from the support for the cage, and drag it along the ground or into the woods, where he is free to break up the cage to access as much of the dough as he wishes. Under these circumstances the consumer may find that his bird feeder is completely gone some mornings. Upon further investigation he will undoubtedly find his wire cage terribly mangled at some remote spot, which may be hundreds of yards into the woods, and with the suet dough remnants coating the residue of what was once the relatively neat wire cage.

The assembly as just set forth is thus fatally damaged, and the recourse is to buy another cage, along with suet cartridges, and re-construct the feeder from scratch. Further, where there is snow on the ground, the necessity to go searching through wooded areas in an attempt to retrieve a bird feeder cage is clearly an aggravating chore, and represents an annoyance at best, as concerns the typical bird loving consumer.

Further, a larger problem exists with smaller animals such as squirrels, as is well known, and has been thoroughly documented in the patented literature as indicated by the brief listing of issued U. S. patents dealing with this subject matter.

Reference is made to the earlier cataloguing of patents relating to squirrels and bird feeders. This listing represents a very small sampling of the existing literature. One studying the subject could easily come to the conclusion that the struggle between the consumer and the common, back-yard squirrel is being won by the squirrel. These small animals seem to be capable of performing whatever acrobatic-like moves are required in order to take control over the particular food station under consideration.

In accordance with the present invention there is provided a novel and improved, especially inexpensive self-contained bird feeder system which is especially adapted to deal with the expense and the mess that characterize many of the prior art devices.

Referring now to FIGS. 3-11 there is illustrated a cartridge 22 containing a cake of suet dough in an arrangement that is especially easy to use, and sufficiently inexpensive to warrant simple replacement as needed, regardless of the efforts of squirrels, foxes and other ground-based mammals, and even bears.

The resulting system enables the consumer to place a feed cartridge at a desired location, even some distance from his living quarters, and to avoid the problems represented by squirrels feeding on the food, or bears snagging the food cartridges and walking off into the woods with them.

As noted, the preferred food for use in the present invention is suet dough, formed into a substantially flat cake 24 that is housed in a container 26 of cellophane or other suitable thin sheet stock. The container housing comprises a generally rectilinear or polygonal shape, having sides 28, a rear section integral with the sides, and a front sheet 32 which is provided with columns or rows of access openings 34, although other configurations could be substituted for the arrangement shown.

By the invention the access openings 34 at the front are covered by a manufacturer's label optionally containing product data involving content, weight and consistency of the suet cake 24 contained therein.

The invention provides a novel on-board suspension linkage or means 38 that adapts itself to simple application as a hook for suspending the suet cake container 26 and contained suet cake while still in its wrapper, from a tree, pole or other desired support structure.

The manufacturer's label 36 has an adhesive backing, and can be peeled off in the manner of the front sheet of the prior art cartridges, shown in FIG. 1. The label 36 is then discarded, and the suspension linkage 38 of the invention is thereby exposed or uncovered. See FIG. 4.

The linkage means 38 comprises a strap 40 connected to the top edge flange 42 by means of an integral living hinge 44. The other end of the strap is connected by a second living hinge 46, to a split loop 48 constituting a hook-like or linking configuration. The split loop 48 has adjoining end portions, each of which carries one of a pair of latch structures 50, FIGS. 5-8 in the form of slits or slit sections that can be momentarily deformed, in order to enable the split loop slits to interengage one another by crosslinking them.

The disclosed system thereby constitutes a unitary feed pack and hanger structure that can be readily put into use by a simple unfolding of the structure from its nesting position which is flat beneath the manufacturer's label and the front face of the cellophane wrap.

Also in accordance with the invention, the rear section of the container can be provided with rows of holes or openings that can normally be sealed off from the exterior of the pack by a secondary manufacturer's label 52 that is provided with an adhesive backing. In such a case, sealing off of the access openings 34 at the front of the container and at the rear thereof may be simply constituted of pre-printed adhesive label stock, which simplifies production, and favors a clean package arrangement that is resistant to inadvertent leakage, either from the inside of the pack to the exterior thereof, or vice versa as regards contaminants and undesirable debris that may be encountered during storage and shipping.

FIG. 12 shows a slightly modified split loop arrangement involving one edge of the split being slotted with a double-backed notch, and the other edge of the split being slotted with a single notch incorporating an "L" shaped cutout.

In place of the modified arrangement just described, a further modified substitute strap 40a is shown in FIG. 13. In this embodiment, the strap is provided in two spaced apart portions or locations, cooperable male and female snap fasteners or buttons 41, 43, said strap portions being capable of being joined to form a loop in the strap. These components are incorporated in the strap at the time the latter is molded. The loop so made can be used to suspend the container or cake from a tree or other support. The numeral 47 indicates the area between the strap portions, along which the strap portions would be folded and the buttons snapped together.

Thus, by using the single-use, disposable, inexpensive arrangement provided by the invention, there is effectively eliminated the need for constant replacement of existing, relatively expensive wire cage units and their supporting hardware. As a consequence, squirrels' and/or bears' activity during periods when the feeder is mostly unattended, are met with simple inexpensive throw away replacement cartridges that are expendable. Because each cartridge has its own concealed suspension/linkage means that can be readily put into action by mere removal of the front manufacturer's label, daily or bi-weekly replacement of a fully self-contained feed apparatus can be fast, and particularly inexpensive and readily at hand.

Furthermore, where the feeder is remotely located but still within visible range, the user can determine if the unit has been damaged, or missing. He can restore the arrangement by simply carrying the cartridge and its on/board hanger to the site and clipping it in place. The user's hands remain clean, and there are no littered cage remnants that would otherwise build up with the prior known systems.

From the above it can be seen that I have provided a novel and improved bird feeder which renders as moot, the issue of feeder damage from squirrels and foxes/bears. It is inexpensive enough to permit easy attachment and removal over any desired time intervals. The invention thus constitutes a distinct advance and improvement in the field of selective feeding of the aviary population.

The present invention may be embodied in other specific forms without departing from the spirit of any of the essential attributes thereof; therefore, the illustrated embodiments should be considered in all respects as illustrative and not restrictive, reference being made to the appended claims and to the foregoing description, to indicate the scope of the invention.

Variations and modifications are possible without departing from the spirit of the invention.

Each and every one of the appended claims constitutes a separate and distinct aspect of the present invention, and accordingly it is intended that each claim be treated as such, when examined an any determination of novelty or validity.

LIST OF REFERENCE NUMERALS

10 Cartridge
12 Sides (4)
14 Rear panel
16 Corner portions
18 Sheet
20 Frontal edge flanges
22 Cartridge
24 Suet cake
26 Container, housing
28 Sides
32 Front sheet
34 Access openings
36 Manufacturer's label, data sheet
38 Suspension/linkage means

40 Strap
41 Male snap fastener button
42 Flange
43 Female snap fastener button
44 Living hinge
46 Second living hinge
47 Area of folding between the strap portions
48 Split loop
50 Latch structure
52 Second manufacturer's label
56 Tree branch
40*a* Modified strap having push button male/female buttons or fasteners The embodiments of the invention in which an exclusive property or privilege is claimed are defined as follows:

1. A disposable bird feeder, comprising in combination:
   a) a substantially expansive, multi-faceted cake constituted of material suitable for consumption by birds,
   b) a protective container of cellulose or plastic substance, encircling the cake on all but one of its faces, said one face having a protective wrapper with a plurality of holes so to expose the cake and enable access thereto through said holes by birds seeking food,
   c) a thin face sheet having an adhesive backing overlying the said one face of the cake, so as to cover the face and at least some of said plurality of holes and thereby effectively isolate the cake from debris and other substances exterior to the cake, said face sheet being removable from the remainder of the protective container,
   d) a flat plastic, resilient latch means sandwiched between the said one face of the cake and the thin face sheet,
   e) a flat plastic strap hingedly connected to the protective wrapper by a living hinge, and said latch means comprising a latching loop hingedly connected to the plastic strap by a second living hinge,
   f) the plastic strap and the latching loop being normally concealed by the thin face sheet and being movable with respect to the protective wrapper and extendable therefrom when the face sheet is removed, so as to form a suspension link between the latch means and the container, whereby the container and the cake can be hung from a tree branch or other support by temporarily opening the resilient latch means and fastening it around said branch or other support.

2. A disposable bird feeder, comprising in combination:
   a) a substantially flat slab of suet cake,
   b) a cellophane or plastic wrap encircling said cake, said wrap having a plurality of access holes on at least one face of said flat slab,
   c) a label having adhesive backing normally covering said at least one face, and barring access to said cake and said plurality of access holes,
   d) a suspension linkage normally concealed in between said label and said at least one face, said linkage comprising a connecting loop, and folded linkage portions connected to one another by a living hinge, and being expandable when said label is manually removed so as to form a hanger having the connecting loop for attachment to a tree branch or support.

3. The invention as set forth in claim 2, wherein:
one of said linkage portions having an integrally formed, plastic male snap button, and a second of said linkage portions having an integrally formed, cooperable plastic female snap button, the snap buttons being capable of interfitting together when the suspension linkage portions are folded back on one another to form the connecting loop for securing the slab of suet cake to a tree branch or other support.

* * * * *